United States Patent [19]

Watanabe

[11] 4,355,753
[45] Oct. 26, 1982

[54] AIR HEATING SYSTEM OF INTERNAL COMBUSTION ENGINE-MOUNTED MOTOR VEHICLE

[75] Inventor: Takeaki Watanabe, Yokohama, Japan

[73] Assignee: Nissan Motor Co., Ltd., Yokohama, Japan

[21] Appl. No.: 151,544

[22] Filed: May 20, 1980

[30] Foreign Application Priority Data

May 31, 1979 [JP] Japan .................................. 54-72446

[51] Int. Cl.³ .............................................. B60H 1/02
[52] U.S. Cl. .................................. 237/12.3 A; 98/2.06; 236/13
[58] Field of Search ............... 98/2, 2.05, 33 A, 33 R, 98/2.06; 237/12.3 A; 165/41, 42; 236/13

[56] References Cited

U.S. PATENT DOCUMENTS

| | | | |
|---|---|---|---|
| 2,237,477 | 4/1941 | Colvin | 98/2.05 |
| 2,627,218 | 2/1953 | Katz | 98/2.05 |
| 2,835,183 | 5/1958 | Miller | 98/2.05 |
| 2,836,113 | 5/1958 | Seyfarth | 98/2.05 |
| 2,893,700 | 7/1959 | Boylan | 98/2.05 |

FOREIGN PATENT DOCUMENTS

| | | | |
|---|---|---|---|
| 1555712 | 4/1970 | Fed. Rep. of Germany | 237/12.3 A |
| 7408174 | 3/1974 | Fed. Rep. of Germany | 237/12.3 A |
| 2030946 | 11/1970 | France | 98/2.05 |
| 2371310 | 11/1970 | France | 98/2.05 |
| 1077148 | 7/1967 | United Kingdom | 98/2.05 |

Primary Examiner—Albert J. Makay
Assistant Examiner—Henry Bennett
Attorney, Agent, or Firm—James C. Wray

[57] ABSTRACT

A damper door unit is swingably disposed in an air intake duct for selectively permitting outdoor intake introduction and indoor air introduction. The damper door unit comprises a main door which is swingably connected to the air intake duct to selectively close an outdoor air intake opening and an indoor air intake opening, and an auxiliary door which is swingably connected to the main door to selectively close and open an opening formed in the main door. When of warming of the passenger compartment is required, the main door takes a position to achieve outdoor air introduction. However, under low speed cruising of the vehicle or at standstill of the vehicle with the engine idling, the auxiliary door opens to a certain extent thereby permitting a certain degree of indoor air introduction.

11 Claims, 7 Drawing Figures

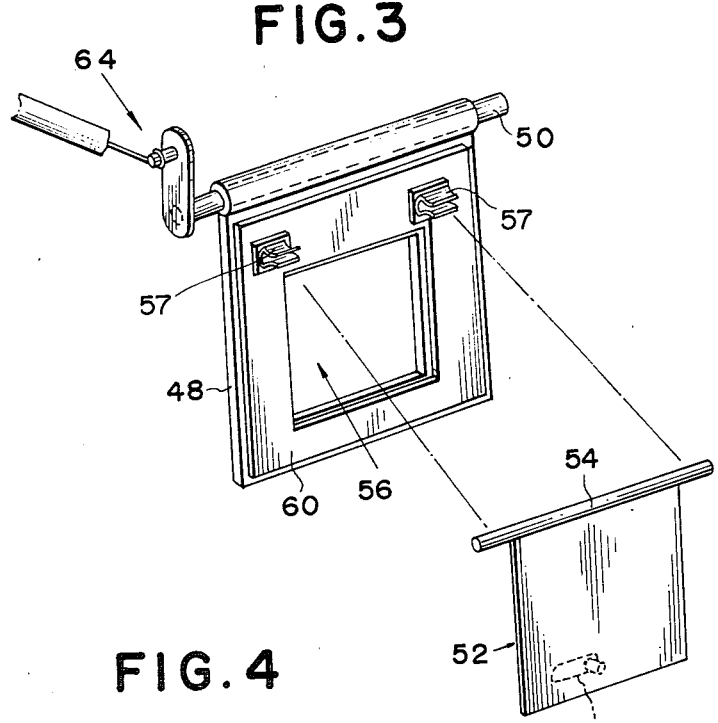
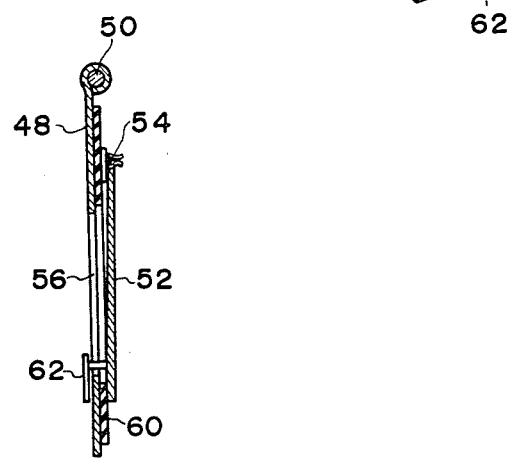

U.S. Patent   Oct. 26, 1982   Sheet 3 of 3   4,355,753
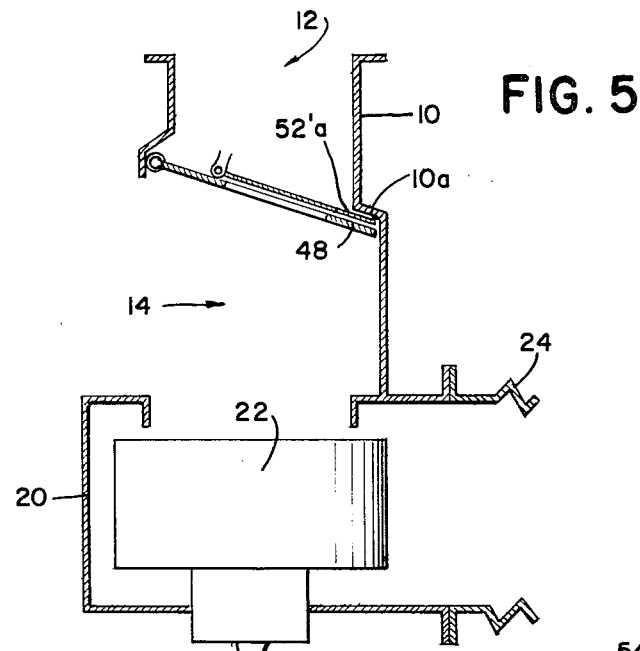
FIG. 5
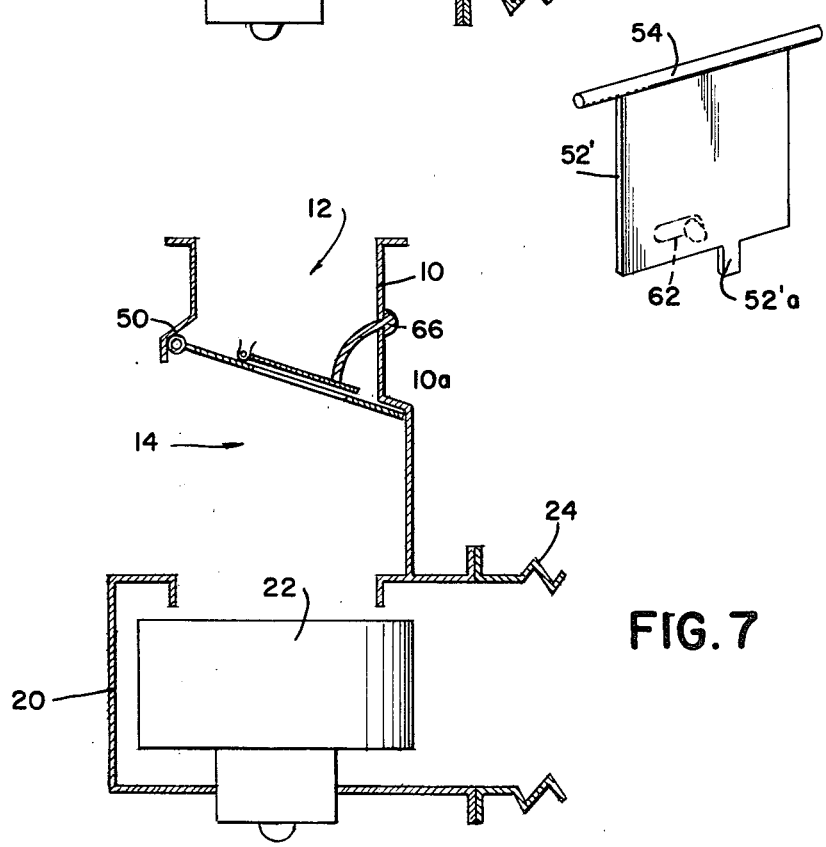
FIG. 6
FIG. 7

4,355,753

AIR HEATING SYSTEM OF INTERNAL COMBUSTION ENGINE-MOUNTED MOTOR VEHICLE

FIELD OF THE INVENTION

The present invention relates in general to an air heating system of an internal combustion engine-mounted motor vehicle for warming air in a passsenger or driver compartment of the vehicle, and more particularly to such an air heating system which uses as an air heating medium an engine cooling water of the internal combustion engine mounted on the vehicle.

OBJECTS OF THE INVENTION

It is an object of the present invention to provide an improved air heating system for an internal combustion engine-mounted motor vehicle, which shows a sufficient heating effect even when the vehicle runs at low speed or the vehicle is at a standstill with the engine idling.

It is another object of the present invention to provide an improved air heating system which is constructed to permit introduction of the indoor air into a heater unit in addition to introduction of the outdoor air when the vehicle runs at low speed or the vehicle is at a standstill with the engine idling.

It is still another object of the present invention to provide an improved air heating system which is constructed to assuredly close the outdoor air intake opening when the system takes an indoor air recirculation position.

It is a further object of the present invention to provide an improved air heating system which can be constructed by slightly modifying a conventionally used air heating system.

Other objects and advantages of the present invention will become clear from the following description when taken in conjunction with the accompanying drawings which will be outlined hereinnext.

BRIEF DESCRIPTION OF THE DRAWINGS

FIG. 3 is a perspective and exploded view of a damper door unit which is equipped in the air intake section of FIG. 2, and FIG. 4 is a sectional view of the damper door unit in assembled condition;

FIG. 5 is a view similar to FIG. 2, but showing a modification of the air intake section;

FIG. 6 is a perspective view of an auxiliary door employed in the modified air intake section of FIG. 5; and FIG. 7 is a view similar to FIG. 2, but showing another modification of the air intake section.

DESCRIPTION OF PRIOR ART AIR HEATING SYSTEM

Prior to describing in detail the construction of the motor vehicle air heating system of the present invention, outlined explanation of a conventionally used air heating system will be made with reference to FIG. 1 in order to clarify the invention.

Figure 1:
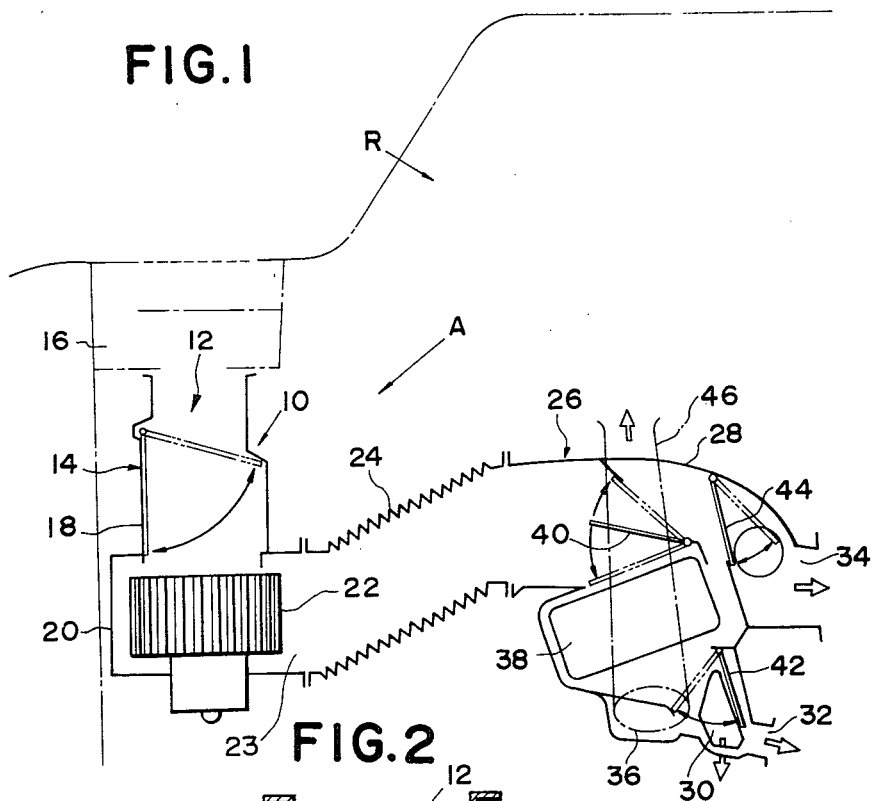
FIG. 1 is a view showing a conventionally used air heating system equipped in an internal combustion engine-mounted motor vehicle.

Referring to FIG. 1, there is shown a conventionally used air heating system of an internal combustion engine-mounted motor vehicle, which is generally designated by reference A. Designated by reference R is a passenger compartment of the vehicle in which the heating system A is mounted. The heating system A generally comprises an air intake duct 10 which has at its upper section an outdoor air intake opening 12 and at its side section an indoor air intake opening 14. The outdoor air intake opening 12 is connected to an air intake grille or a cowl box 16 through which surrounding air is introduced into the air intake duct 10. Within the duct 10, a damper door 18 is disposed which is operable to swing between two rest positions, one rest position being a position to close the outdoor air intake opening 12 (as illustrated by phantom lines) and the other rest position being a position to close the indoor air intake opening 14 (as illustrated by solid lines). Furthermore, within the duct 10, more particularly within an enlarged portion 20 of the duct 10 is mounted an electric fan 22 which produces air flow directing air from the air intake duct 10 toward a heater unit 26 which will be explained hereinnext. The enlarged portion 20 has an outlet opening 23 which is communicated via a flexible tube 24 with a heater unit generally designated by numeral 26. The heater unit 26 includes a housing 28 having an inlet opening (no numeral) connected to the tube 24 and a plurality of outlet openings 30, 32, 34 and 36 from which heated air blows into the passenger compartment R. Within the housing 28 are disposed a heater core 38 and damper doors 40, 42 and 44. Designated by phantom line 46 is a defroster tube which leads to lower portions of a front window shield (not shown) of the vehicle. The heater core 38 is of a type which uses as an air heating medium an engine cooling water which travels in a water jacket (not shown) of the engine to cool the engine.

Under operation of the heating system A, the indoor air intake opening 14 is kept closed by the damper door 18, permitting the outdoor air intake opening 12 to open, so that the outdoor air is forced to come through the air intake duct 10 into the heater unit 26 and is heated suitably by the heater core 38 before discharging into the passenger compartment R through the outlet openings 30, 32, 34 and 36.

Apart from the above, modernized internal combustion engines for automobiles are designed to operate economically even under low speed operation of the engines. These engines however encounter a drawback, originating from the economization in fuel consumption appearing at the low speed operation of the engines, in which upon idling of the engine or low speed cruising of the vehicle, the temperature of the engine cooling water fails to rise to a level sufficient to normally operate the heater core 38 in the heater unit 26. Thus, when, under the low speed operation of the engine, the heating system A operates with the outdoor air intake opening 12 open, the air travelling through the heater unit 26 is not sufficiently heated by the heater core 38 thereby causing a failure in heating the passenger compartment at a comfortably heated level. This problem appears more markedly when the engine is of the Diesel type.

The above-mentioned drawback may be solved by positioning the damper door 18 to close the outdoor air intake opening 12 permitting openings of the indoor air intake opening 14. In this condition, the warm air in the passenger compartment is recirculated through the heater unit A without feeding of the cold outdoor air into the unit A. However in this condition, the inner surface of the window shield becomes cloudy by increased moisture mainly caused by the presence of passengers in the compartment (However, it should be noted that in very cold days, the damper door 18 is positioned to completely close the outdoor air intake opening 12 for heating the passenger compartment R at the comfortably heated level, without respect to the increased moisture in the compartment R.).

As an alternative way to solve the above-mentioned drawback, a measure has been also employed in which operation of the damper door 18 is controlled by movement of an accelerator pedal of the motor vehicle such that when the accelerator pedal is depressed to a certain extent causing relatively high speed operation of the engine, the damper door 18 takes a position to open the outdoor air intake opening 12 and close the indoor air intake opening 14, but when the accelerator pedal is not depressed or only slightly depressed causing relatively low speed operation of the engine, the damper door 18 takes a position to close the outdoor air intake opening 12 and open the indoor air intake opening 14. However, this measure causes complicated and bulky construction of the device by which the measure is brought into practical use.

Of course, a measure may be available in which operation of the damper door 18 is manually controlled by a driver or a passenger in accordance with the vehicle running condition. This measure is not practical because of complicatedness in handling the damper door 18.

Accordingly, elimination of the above-mentioned drawbacks encountered in the conventional air heating systems is an essential object of the invention.

DESCRIPTION OF THE EMBODIMENT

Figure 2:
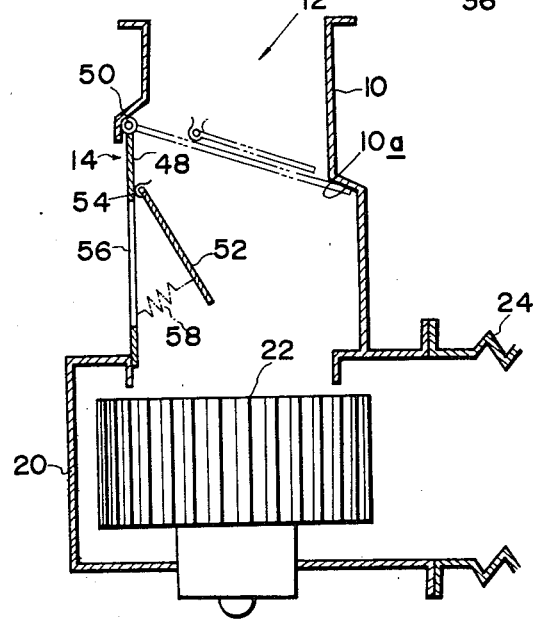
FIG. 2 is a view showing an air intake section of the air heating system of the present invention.

Referring to FIGS. 2 to 4, particularly FIG. 2, there is shown an air intake section of an air heating system according to the present invention. Substantially the same parts as in the case of the aforementioned conventional system are designated by the same numerals particularly in FIG. 2.

According to the invention, an improved damper door unit is employed as a substitute for the damper door 18 in FIG. 1. As is seen from FIG. 2, the unit comprises a main door 48 swingingly connected at its upper section to the intake duct 10 by means of a pivot shaft 50. The main door 48 is thus operable to swing from one rest position to close the outdoor air intake opening 12 to the other rest position to close the indoor air intake opening 14. As is best seen in FIG. 3, the main door 48 is provided with an auxiliary door 52 thereon. The auxiliary door 52 is swingably connected at its upper section to the main door 48 by means of a pivot shaft 54 so that the auxiliary door 48 is operable to open or close an opening 56 formed in the main door 48. For catching the shaft 54 two holders 57 are mounted to the main door 48. The auxiliary door 52 is arranged on the inside surface of the main door 52 so that when the main door 48 takes the position to close the indoor air intake opening 14, the auxiliary door 52 is swingable within the intake duct 10. As will become clear as the description proceeds, the auxiliary door 52 is arranged to open to a certain extent by force of intake vacuum which is created in the intake duct 10 upon operation of the electric fan 22 when the main door 48 closes the indoor air intake opening 56. The opening movement of the auxiliary door 52 is made against the weight of the door 52. Thus, by selecting the weight of the door 52, the opening degree of the door 52 relative to the opening 56 of the main door 48 is suitably determined. Further, as is indicated by a phantom line 58, a tension spring may be used for biasing the door 52 to take its close position. Such tension spring 58, a spiral spring to be mounted about the pivot shaft 54.

FIGS. 3 and 4 show a detailed construction of the damper door unit. As is clearly shown in these drawings, a sealing mat 60 constructed of for example a soft rubber film is attached or affixed to the inner surface of the main door 48 so that upon closing of the main door 48 relative to the outdoor air intake opening 12 of the intake duct 10, assured sealing is made between the door 48 and a door seat portion (10a, see FIG. 2) formed on the intake duct 10, and upon closing of the auxiliary door 52 relative to the opening 56 of the main door 48, assured sealing between these doors 48 and 52 is also made. Thus, when in a very cold day the damper door unit is in a position to close the outdoor air intake opening 12 as is indicated by phantom lines in FIG. 2, there occurs no air flow in the direction from the outdoor air intake opening 12 to the heater unit 26. This induces sufficient heating of air in the passenger compartment R.

The auxiliary door 52 is provided thereon with a locking arm 62 which is operable to lock the auxiliary door 52 in its closing position relative to the main door 48. In a hot day season such as in summer when use of the air heating system is not required, the damper door unit takes a position to close the indoor air intake opening 14, opening the outdoor air intake opening 12, and the auxiliary door 52 is locked by the locking arm 62 to the main door 48.

Indicated by numeral 64 in FIG. 3 is a link which leads to a known control unit (not shown). By shifting a lever of the control unit in a predetermined direction, the link 64 moves in a given direction to swing the damper door unit about the shaft 50 permitting the damper door unit to take one of the above-mentioned two rest positions.

The following description is directed to operation of the auxiliary door 52 of the damper door unit under a condition wherein the electric fan 22 operates and the damper door unit, more particularly the main door 48, takes the position to close the indoor air intake opening 14 as is shown in FIG. 2 by solid line, permitting introduction of the outdoor air into the heater unit 26 via the outdoor air intake opening 12.

When the vehicle cruises at relatively low speed or is at standstill with the engine idling, which causes insufficient heating of the engine cooling water fed to the heater core 38 and causes a wind pressure applied to the air intake grille 16 to be small or substantially zero, the operation of the electric fan 22 produces a condition wherein the pressure in the intake duct 10 is lower than that of the passenger compartment R. Thus, the auxiliary door 52 is forced to open against its own weight (or against the biasing force of the spring 58) thereby to introduce the indoor air into the intake duct 10 for mixing the indoor air with the outdoor air which comes from the outdoor air intake opening 12. The mixed air is introduced by the electric fan 22 into the heater unit 26 to be heated by the heater core 38 and is discharged into the passenger compartment R via the outlet openings 30, 32, 34 and 36. It will be appreciated that the opening degree of the auxiliary door 52 relative to the opening 56 of the main door 48 depends on the pressure difference appearing between the intake duct 10 and the passenger compartment R, so that the rotational speed of the electric fan 22 and the vehicle speed will determine such opening degree. Now, it should be noted that the addition of the indoor air to the outdoor air in the air intake duct 10 causes a rise of temperature of the air directed to the heater core 38, so that the air discharged into the passenger compartment R from the outlet openings of the heater unit becomes to have sufficient heat energy to warm up the passenger compartment R to a sufficient level. Thus, even when the vehicle cruises at low speed or the vehicle is at standstill with the engine idling, the temperature in the passenger compartment R is kept at sufficient and comfortable level.

When the vehicle cruises at relatively high speed, causing a wind pressure applied to the cowl box 16 to be increased, the pressure in the intake duct 10 becomes higher than that in the passenger compartment R even under operation of the electric fan 22. In this condition, the auxiliary door 52 is kept closed by a force generated by pressure difference between the intake duct 10 and the passenger compartment R, so that the air directed toward the heater core 38 is only the outdoor air coming from the outdoor air intake opening 12. However, it should be noted that under high or medium speed cruising of the vehicle which causes high or medium speed operation of the engine, the heater core 38 is given with as a heating medium the engine cooling water which is heated to a sufficient level to warm up the cold outdoor air passing through the heater unit 33 to a sufficient level.

From the above description, it will be appreciated that since the cold outdoor air is mixed with the warmed indoor air before introduction into the heater unit 38 when the heater core 38 is not given with sufficiently heated engine cooling water due to low speed operation of the engine, the air discharged into the passenger compartment R becomes to have a heat energy for warming the compartment R sufficiently.

Since the air discharged into the passenger compartment R comprises at least the outdoor air, the undesired phenomenon in which the inner surface of the window shield becomes cloudy is eliminated.

Further in the invention, since the opening degree of the auxiliary door 52 relative to the opening 56 of the main door 48 is determined in accordance with the vehicle speed, the volume of the indoor air recirculated into the heater unit is automatically controlled depending on the vehicle speed. More particularly, within the range between the idling speed and the medium speed of the engine, the opening degree of the auxiliary door 48 and thus the volume of the recirculated indoor air into the heater unit are decreased as the vehicle speed increases.

Referring to FIGS. 5 and 6 there is shown a modification of the air intake section of FIG. 2. In this modification, the auxiliary door 52' has a projection 52' a integrally formed on the lower section thereof, as is best shown in FIG. 6. The projection 52' a is sized and positioned to be sandwiched between the door seat portion 10a of the intake duct 10 and the main door 48 when the damper door unit takes a position to close the outdoor air intake opening 12. Thus, when taking such position, the auxiliary door 52' is assuredly prevented from rattling, thereby assuring seal between the outdoor air intake opening 12 and the downstream section (such as the enlarged portion 20) of the intake duct 10. Referring to FIG. 7, there is shown another modification of the air intake section of FIG. 2. In this modifiation, an elongated member 66 made of a flexible material such as flexible rubber or polyurethane foam is fixed to the side wall of the outdoor air intake opening 12 to protrude downwardly as shown. Similarly to the case of FIG. 5, the provision of the elongate member 66 assures the seal between the outdoor air intake opening 12 and the downstream section of the intake duct 10 under the condition that the damper door unit takes a position to close the outdoor air intake opening 12, as will be understood from the drawing.

Although in the aforementioned description, explanation has been made with respect to an air heating system employing a heater unit 26, the measure according to the invention is applicable to an air conditioning system (not shown) which comprises generally the same parts and constructions as in the case of the above-mentioned air heating system except that in the air conditioning system, a cooling core such as an evaporator is installed in an air conditioning unit which corresponds to the heater unit 26. Upon operation of the cooling core for cooling the passenger compartment R, the damper door unit takes the position to close the outdoor air intake opening 12 for introducing into the intake duct 10 only the indoor air via the indoor air intake opening 14. Under this condition, the auxiliary door 52 assuredly closes the opening 56 of the main door 48 by its own weight as well as a force which is produced by ram effect occuring in the cowl box 16 under the vehicle cruising, thereby to assure sealing between the interior of the intake duct 10 and the atmospheric air surrounding the vehicle. Of course, application of the measure of FIG. 5 or FIG. 7 to the air conditioning system mentioned above improves such sealing.

What is claimed is:

1. An air heating system of an internal combustion engine-mounted motor vehicle for heating a passenger compartment, having an air passage means extending from an outdoor air intake to a selected portion of the passenger compartment; a heater core disposed in the air passage means for heating, by using engine cooling water as a heating medium, air which travels in said air passage means toward the passenger compartment; a fan disposed in said air passage means at a position upstream of the heater core for producing air flow directed toward the passenger compartment; an indoor air intake opening formed in said air passage means at a position upstream of said fan, said opening being open to said passenger compartment; and a damper door pivotally mounted in said air passage means and having first and second rest positions, said first position being a position to close said outdoor air intake while opening said indoor air intake opening, said second position being a position to close said indoor air intake opening while opening said outdoor air intake, wherein said damper door is formed with an opening and wherein an auxiliary door is pivotally connected to said damper door to selectively close and open said opening in the damper door, the connection of said auxiliary door to said damper door being such that when said damper door takes said second rest position and the pressure in the air passage means at the portion upstream of said fan is lower than that in the passenger compartment, said auxiliary door is forced to open to a certain extent permitting introduction of passenger compartment air into the air passage means through said opening in the damper door.

2. An air heating system as claimed in claim 3, wherein the connection of said auxiliary door to the main door is further such that when said main door takes said second rest position and the wind pressure applied to said first opening causes the pressure in the air intake duct to be greater than that in the passenger compartment, said auxiliary door closes to prevent introduction of the air in the passenger compartment into the air intake duct.

3. An air heating system of an internal combustion engine-mounted motor vehicle for warming up a passenger compartment of said vehicle, comprising:

a heater unit for heating air coming thereto before the air is discharged therefrom into the passenger compartment, by using as a heating medium an engine cooling water of said engine;

an air intake duct having first, second and third openings which respectively communicate with the exterior of said vehicle, the passenger compartment of the interior of said heater unit;

a fan producing an air flow directing from said intake duct toward said heater unit;

a main door swingably disposed in said air intake duct and being operable to take first and second rest positions, said first rest position being a position to close said first opening while keeping communication between said second and third openings, said second rest position being a position to close said second opening while keeping communication between said first and third openings, said main door being formed with an opening; and an auxiliary door swingably connected to said main door to selectively close and open the opening of said main door, the connection of said auxiliary door to the main door being such that when said main door takes said second rest position and the operation of said fan causes the pressure in the air intake duct to be lower than that in the passenger compartment, said auxiliary door opens to a certain extent permitting introduction of the air in the passenger compartment into the air intake duct via said opening in the main door.

4. An air heating system as claimed in claim 3, further comprising biasing means which biases said auxiliary door to swing in a direction to close the opening of said main door.

5. An air heating system as claimed in claim 3, further comprising an air intake grille which is mounted on a body of said vehicle and is connected to said first opening of said air intake duct, the arrangement of said air intake grille with respect to the vehicle body being such that when said vehicle runs at a certain speed, a certain pressure arises in said air intake duct.

6. An air heating system as claimed in claim 3, further comprising a sealing mat which is affixed to a surface of said main door for assuring, upon closing of said auxiliary door relative to the opening of said main door, sealing between said main and auxiliary doors.

7. An air heating system as claimed in claim 3, in which said fan is an electric fan operatively disposed in said air intake duct at a position close to said third opening.

8. An air heating system as claimed in claim 7, further comprising locking means which is operable to lock said auxiliary door in its closed position relative to the opening of said main door.

9. An air heating system as claimed in claim 3, further comprising stopping means which assures closing of the auxiliary door relative to said opening of said main door when said main door takes said first rest position.

10. An air heating sysem as claimed in claim 9, in which said stopping means comprises a projection formed on said auxiliary door and a door seat portion formed in said air intake duct just downstream of said first opening, said projection being constructed to be sandwiched between the door seat portion and said main door when said main door takes said first rest position.

11. An air heating system as claimed in claim 9, in which said stopping means comprises a flexible elongate member which is fixed to a side wall of said first opening to protrude downstreamly, the elongate member being such sized to reach the auxiliary door when said main door takes said first rest position.

* * * * *